(12) United States Patent
Notari et al.

(10) Patent No.: US 11,115,278 B2
(45) Date of Patent: Sep. 7, 2021

(54) LEARNING BY INFERENCE FROM BROWNFIELD DEPLOYMENTS

(71) Applicant: Cisco Technology, Inc., San Jose, CA (US)

(72) Inventors: Jason David Notari, Pleasanton, CA (US); Manish Chandra Agrawal, San Jose, CA (US); Liqin Dong, San Jose, CA (US); Lukas Krattiger, Pleasanton, CA (US); Patnala Debashis Rao, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 16/283,958

(22) Filed: Feb. 25, 2019

(65) Prior Publication Data
US 2020/0274766 A1     Aug. 27, 2020

(51) Int. Cl.
*H04L 12/24*     (2006.01)

(52) U.S. Cl.
CPC ...... *H04L 41/0843* (2013.01); *H04L 41/0672* (2013.01); *H04L 41/0816* (2013.01); *H04L 41/0873* (2013.01); *H04L 41/0886* (2013.01); *H04L 41/0893* (2013.01)

(58) Field of Classification Search
CPC ............. H04L 41/0843; H04L 41/0672; H04L 41/0816; H04L 41/0873; H04L 41/0886; H04L 41/0893
See application file for complete search history.

(56) References Cited

U.S. PATENT DOCUMENTS

| | | | |
|---|---|---|---|
| 9,459,859 B2 * | 10/2016 | Borden | G06F 8/60 |
| 10,033,595 B2 | 7/2018 | Sif et al. | |
| 10,193,753 B1 * | 1/2019 | Tabet | H04L 41/0843 |

(Continued)

OTHER PUBLICATIONS

International Search Report and Written Opinion from the International Searching Authority, dated Jun. 4, 2020, 14 pages, for corresponding International Patent Application No. PCT/US2020/019047.

(Continued)

*Primary Examiner* — Uzma Alam
(74) *Attorney, Agent, or Firm* — Polsinelli (57) ABSTRACT

The present technology provides a system, method and computer-readable medium for configuration pattern recognition and inference, directed to a device with an existing configuration, through an extensible policy framework. The policy framework uses a mixture of python template logic and CLI micro-templates as a mask to infer the intent behind an existing device configuration in a bottom-up learning inference process. Unique values for device/network identifiers and addresses as well as other resources are extracted and accounted for. The consistency of devices within the fabric is checked based on the specific policies built into the extensible framework definition. Any inconsistencies found are flagged for user correction or automatically remedied by a network controller. This dynamic configuration pattern recognition ability allows a fabric to grow without being destroyed and re-created, thus new devices with existing configurations may be added and automatically configured to grow a Brownfield fabric.

20 Claims, 5 Drawing Sheets

(56) References Cited

U.S. PATENT DOCUMENTS

| | | | |
|---|---|---|---|
| 2009/0276076 A1* | 11/2009 | Takahashi | G05B 23/0213 |
| | | | 700/110 |
| 2011/0099139 A1 | 4/2011 | Coldicott et al. | |
| 2014/0177476 A1* | 6/2014 | Perrett | H04L 41/145 |
| | | | 370/255 |
| 2016/0099883 A1 | 4/2016 | Voit et al. | |
| 2017/0180459 A1* | 6/2017 | Frank | H04L 41/5048 |
| 2018/0176252 A1 | 6/2018 | Nimmagadda et al. | |
| 2018/0205600 A1* | 7/2018 | Burton | H04L 67/1097 |
| 2018/0210927 A1* | 7/2018 | Karam | G06F 16/248 |
| 2018/0300124 A1* | 10/2018 | Malladi | H04L 12/2823 |
| 2019/0034716 A1* | 1/2019 | Kamarol | G06F 21/6245 |
| 2019/0199597 A1* | 6/2019 | Valisammagari | H04L 41/5045 |
| 2019/0220271 A1* | 7/2019 | Olderdissen | G06F 8/654 |

OTHER PUBLICATIONS

Enck, William, et al., "Configuration Management at Massive Scale: System Design and Experience," IEEE Journal on Selected Areas in Communications, vol. 27, No. 3, Apr. 2009, pp. 323-335.

\* cited by examiner

LEARNING BY INFERENCE FROM BROWNFIELD DEPLOYMENTS

TECHNICAL FIELD

The present technology pertains to systems and method for migrating networking devices onto new management platforms. More specifically, it is directed to extending an automated fabric management platform to Brownfield (previously deployed) devices.

BACKGROUND

In networking, a greenfield deployment may refer to an installation and configuration of a network where none existed before, for example in a new office. A brownfield deployment, in contrast, may refer to an upgrade or addition to an existing network and may use some legacy components. Accordingly, Brownfield (fabric) deployment in networking industry may refer to problem spaces needing the development and deployment of new configurations and/or software systems in the presence of existing (legacy) configurations and/or software applications/systems. A network fabric is generally characterized by a set of individual network devices that are consistently configured, such that their collective operation/behavior resembles that of a single logical system. The device configurations required for constructing a fabric may be accomplished, for example, by using Command Line Interface (CLI), scripts and/or Application Program Interfaces (APIs). Historically, the most common method of interacting with a computing system has been the Command Line Interface (CLI). However, as it relates to networking, CLI has traditionally been a very manual approach to legacy network management that involves deploying and managing device configurations on an individual line-by-line basis. This approach, however, may not sufficiently support large scale deployment and management requirements of modern networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, methods, and non-transitory computer-readable storage medium for automated learning/inference of a device configuration intention using a series of system-defined configuration templates to match corresponding portions of a device running a configuration and extracting relevant resource names and values therefrom. Aspects of the disclosed technology are further directed to a use of high-level programming language based templates for inferring higher order relationships associated with various configuration components of a device running configuration.

In one aspect of the present technology, a method includes providing a plurality of configuration templates for matching one or more aspects of a Brownfield device existing configuration, based on one or more matching criteria associated with each of the plurality of configuration templates; the method further includes instantiating one or more variables associated with each of the plurality of configuration templates with corresponding parameter values retrieved from a matched portion of the Brownfield device existing configuration, to thereby create one to more template instances; validating each of the one or more template instances against known fabric policies to generate one or more Policy Template Instances and storing the one or more Policy Template Instances associated with a device existing configuration as a representation of a device expected configuration.

In some embodiments of the present technology, the plurality of configuration templates for matching one or more aspects of an existing configuration of a Brownfield device may be generated by a network management service. The network management service may be implemented as part of a Data Center Network Manager. Furthermore, the plurality of configuration templates may comprise one or more Command Line Interface (CLI) configuration templates. The plurality of configuration templates may further comprise one or more Python templates for inferring higher order aspects of a Brownfield device intended operation.

In some embodiments of the present technology, an alert may be generated in an event of a conflict between one or more configuration template instances and known fabric policies and/or best practices. In accordance with some embodiments of the present technology, one or more configuration statements may be added to an expected device configuration in order to bring the expected device configuration into compliance with one or more fabric best practice policy and completeness requirements. Updating and confirming the representation of a device expected configuration may be responsive to one or more user inputs.

In one aspect of the present technology, a system includes one or more processors and at least one computer-readable storage medium with stored instructions, which when executed by the one or more processors cause the one or more processors to: retrieve a running configuration for one or more Brownfield devices designated for deployment onto a fabric; match one or more aspects of the running configuration based on one or more matching criteria associated with each of a plurality of templates; instantiate one or more template variables for each of the plurality of templates with one or more corresponding parameter values retrieved from a matched portion of a Brownfield device configuration to thereby create one to more template instances; validate each of the one or more template instances against known fabric policies; and store one or more validated template instances associated with a device configuration as a representation of an intent associated with the device configuration.

In one aspect of the present technology, at least one non-transitory computer-readable storage medium includes stored instructions, which when executed by one or more processors cause the one or more processors to: retrieve a running configuration for one or more Brownfield devices designated for deployment onto a fabric; match one or more aspects of the running configuration based on one or more matching criteria associated with each of a plurality of templates; instantiate one or more template variables for each of the plurality of templates with one or more corresponding parameter values retrieved from a matched portion of a Brownfield device configuration to thereby create one to more template instances; validate each of the one or more template instances against known fabric policies; and store one or more validated template instances associated with a device configuration as a representation of an intent associated with the device configuration.

DETAILED DESCRIPTION

Today, when networks are being built the starting point is generally adding a controller to the network and then building the network around the controller thus enabling the controller to learn the network architecture and the intended purpose and function of each network component as the network is constructed device by device, policy by policy and integrate the knowledge in a way that enables it to manage the network in an automated fashion. Adding a controller to a manually built network would require re-building the network from scratch which is not a desirable approach. The present disclosure describes an alternative approach for onboarding existing (pre-configured) devices onto a managed/controlled platform based on a mechanism for interring and assimilating the intent associated with an existing network configuration (i.e., by using pattern recognition as well as other related inference mechanics) and modeling the inferred behavior in the controller system. Therefore, some embodiments of the present technology provide an improved brownfield fabric deployment wherein a network controller or management entity may learn or infer the intent of an existing network such that it may continue operating the network as if it was built from the ground up. This approach allows a fabric to grow without having to take apart and re-create a network using the controller, and allowing new Greenfield devices to be easily added and automatically configured to grow a Brownfield fabric. Learning the intent behind a device configuration may be required for identifying and rectifying any potential conflicts with the rules and policies of the fabric platform onto which the device is being migrated. Thus facilitating the creation and deployment of an optimal platform compliant version of the device configuration. An updated and accurate inventory of fabric related resources and device information may also be required for facilitating any future modifications to the fabric.

A common mechanism for interacting with managed devices and implementing machine-to-machine state synchronization is the Command Line Interface (CLI). CLI provides a concise format for viewing as well as changing a device configuration. This method, however, is not well suited for allowing a user to consistently deploy configuration across a set of individual elements, or whole networks. One remedial approach may be the use of CLI configuration templates. The use of templates provides a customizable way for a user to reproducibly configure network devices in a very concise way. CLI templates are a set of re-usable device configuration commands with the ability to parameterize select elements of the configuration as well as add control logic statements. Such (CLI) configuration template may be used by, for example, a Data Center controller, to generate a device deployable configuration by replacing the parameterized elements (variables) with actual values and evaluating the control logic statements. This may prove useful for Greenfield deployment, wherein a new Greenfield device (without a pre-existing operational configuration) is being integrated onto a fabric. For such cases, a new fabric-compliant configuration may be created and deployed onto the Greenfield device using, for example, a set of configuration templates. This may be performed by a network controller in an orchestrated fashion which increases reliability and reduces operational expenses. In the case of Brownfield devices (devices with pre-existing operating configuration being re-deployed onto a new management platform), the orchestration process may become challenging. One of the problems involved with the orchestration of Brownfield devices is recognizing and accounting for pre-configured resources (IP addresses, IDs, etc.), as well as verifying configuration consistency for the variants of fabrics that may exist. Once an existing device configuration including relevant resource values is learned by a network controller, a new fabric-compliant configuration may be generated and deployed with confidence. The challenge of accomplishing this using configuration templates is that templates have historically been single use tools, enabling a unidirectional information flow. This means that although templates may be useful (and have been historically used) in building a configuration from the ground up or providing new configuration information to the device, their conventional method of use does not allow for extracting or gleaning of information from an existing device configuration through pattern recognition and inference.

The problem of pattern recognition and inference may be further exacerbated by the vast variability of fabrics. The foregoing are addressed by some embodiments of the present technology directed to a network management service/system capable of providing pattern recognition and inference functionality through an extensible policy framework. The extensible policy framework in accordance to some embodiments uses a mixture of software template logic and CLI micro-templates as a mask to infer the intent behind a previously deployed device configuration (management system may use different masks to infer intention behind different aspects of a device configuration). In this way, unique values for IP addresses and other resources may be extracted and accounted for, while the consistency of devices within the fabric may be checked based on the specific "policies" built into the extensible framework definition. Once a consistent fabric is learned no further change may be required or recommended, but if inconsistencies are found, issues may be flagged and remediation suggested.

As such, embodiments of the present technology provide for automatically learning the intent behind a device network-related configuration and recording and tracking new network resource names, identifiers, addresses, and other relevant parameters and attributes.

In accordance with some embodiment of the present technology a network controller learns the intended purpose and function of a Brownfield device from the existing device configuration by parsing and analyzing the device configuration using configuration (micro) templates associated with the fabric policy framework or expected configuration. For example, user intention behind the existing configuration may be learned by matching various portion of a device running a configuration against one or more controller/administrator defined configuration templates until the configuration intent is fully mapped out and learned. The parsing process may capture both the configuration template (which may be used for specific purposes within a fabric) as well as any associated user-specified parameters and values. The device intentions are validated against the fabric intention and stored as Policy Template Instances (PTI). Errors may be generated if conflicts are found.

(Micro)templates may be regarded as variabilized configuration blocks, each of which matches an aspect of a device running configuration. A network management service may generate general configuration statements from a configuration template in order to match the current running configuration of a device. The temple generated configuration expressions may then be used as masks to identify matching configuration patterns in the device running configuration. When a portion of a device running configuration matching a specific template-generated configuration expression is found, the network management service may extract relevant network-related parameter values and other key information from the relevant portion of the device running configuration. The extracted information may then be checked against fabric policies and operation standards for consistency. This dynamic pattern recognition ability allows for learning and accounting of IP addresses, IDs and Subnets over links (for example). Once the addressing information is learned, automatic allocation of subnets on new links that are later created may be carried out.

In accordance with some embodiments of the present technology, a network management service or controller may combine physical topology information, learned via a network discovery mechanisms such as the Cisco Discovery Protocol (CDP), with the extracted. device configuration parameter values to infer a baseline configuration for the device which is required for facilitating orchestration. Once the controller learns a baseline configuration for the device, fabric deployment and management of the device can proceed in a completely automated way in much the same way as a new device deployment wherein ail the network-related information may be provisioned in the device by the network controller.

In accordance with some embodiments of the present technology, any configuration changes required to bring a device with a pre-existing configuration into compliance with the rules and policies of the fabric may be identified by a network management entity (i.e., data center network manager (DCNM)) and automatically generated and deployed onto the device.

A network management service may generate one or more general configuration expressions from a template and subsequently traverse a configuration file pulled from a Brownfield device in order to identify a match with the template-generated expressions. Upon finding a match, the network management service may pull out the relevant parameter values such as interface/host names, IP addresses, and other identifying tags, from the matched portion of a device running configuration. The network management service may then compare the learned configuration block against defined fabric norms and standards, to ensure uniqueness of assigned IP addresses) and consistency in terms of IP address connectivity of the learned port (indicated in the template) and the port on the other side of the physical/logical link.

Figure 1:
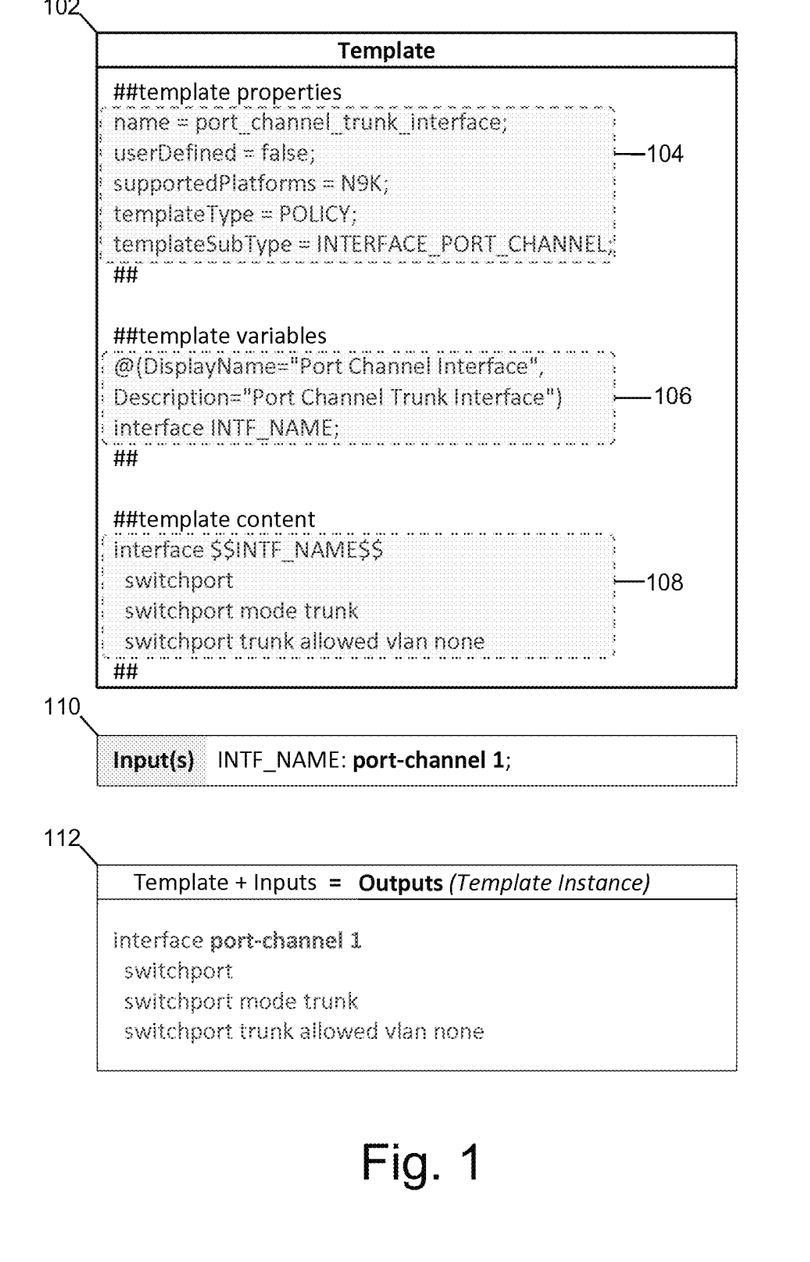
FIG. 1 illustrates an example micro-template, in accordance with some embodiments of the present technology.

FIG. 1 illustrates an example configuration template 102 in accordance with some embodiments of the present technology. The example configuration template 102 consists of three general sections, namely a template properties section 104, a template variables (parameters) section 106 and a template content section 108. Template properties section provides basic template information or metadata such as a descriptive Template name (i.e., port-channel_trunk_interface), a list of platforms on which the provided configurations are supported (i.e., N9K), a Template type (i.e., POLICY template) and a subtype (i.e., INTERFACE_PORT_CHANNEL). Template properties section 104 of the example configuration template 102 also comprises a "UserDefined" statement with a false value indicating that the template is not user created. Information provided by the template properties section may be used as template tags to facilitate grouping of templates or to narrow down the search for a desired configuration template from a template inventory based on the assigned tags. For example, template Type and SubType statements in the template properties section 104 associate the template with Policy-related configuration for a configuring a device interface as a port channel which is a logical interface created by aggregating multiple physical interfaces.

A configuration template is conventionally utilized as a tool to generate and replicate a device deployable configuration by replacing the parameterized elements (variables) with actual values and evaluating the control logic statements. As such a key component of a configuration template may be the Variables section which contains one or more declared variables, along with the associated data types, default values, and one or more valid value conditions for the variable parameters that are used in the template. These declared variables may be used for value substitution in the template content section during the execution of the template. For example, the Variables section 106 of the example configuration template 102 provides a single variable parameter INTF_NAME to be instantiated with an input of data type interface. The validation conditions specified for the Template Variable in section 106 of the configuration template 102 requires that the provided interface identifier value corresponds to a device interface for which the "DisplayName" and "Description" validation attributes are respectively set to "Port Channel Interface" and "Port Channel Trunk Interface."

In accordance with some embodiments of the present technology extraction of relevant identifiers and address parameters from a running configuration on a device to thereby facilitate an inference of intent behind an existing device configuration may be accomplished by reverse mapping of a plurality of configuration templates to a device running configuration. For example, in the Variables Section 106 of the template 102, a pre-defined template variable INTF_NAME is assigned an interface identifier value that is extracted from a portion of a device running configuration associated with an interface with matching values for the "DisplayName" and the Description attributes (i.e., a DisplayName value of "Port Channel Interface" and a Description value of "Port Channel Trunk Interface.") With reference to section 110 in the example of FIG. 1, an interface identifier value corresponding to port-channel 1 is extracted from a portion of a running configuration matching the validations conditions for DisplayName and Description for an interface data-type as specified in template 102.

A template content section may include one or more configuration commands along with any parameter to be included in the template. Template content may include static as well as variablized configuration expressions. Variabilized configuration expressions may include the variables declared in the template variables section. During the template execution process, these declared variables may serve as the parameters of the template to be used for value substitution in the template content section. Variable values may be substituted appropriately in the template content. These parameter values along with the static portion of template content comprise a Template Instance which is what is learned via the reverse template process. A Template Instance 112 associated with the example configuration template 102 is illustrated in FIG. 1.

Certain configuration options may have dependencies such that if all the required options are not enabled with a protocol module the operation will not complete. Such dependencies may be explicitly specified within the configuration template itself to thereby guide the orchestration behavior. For example, a Template content section may specify a block of configuration which needs additional configuration to exist in order to function properly. A simple example would be configurations which require feature enablement. A slightly more complex example may involve configuration which requires other configuration. An example of this is provided by way of Template 202 in FIG. 2.

Figure 2:
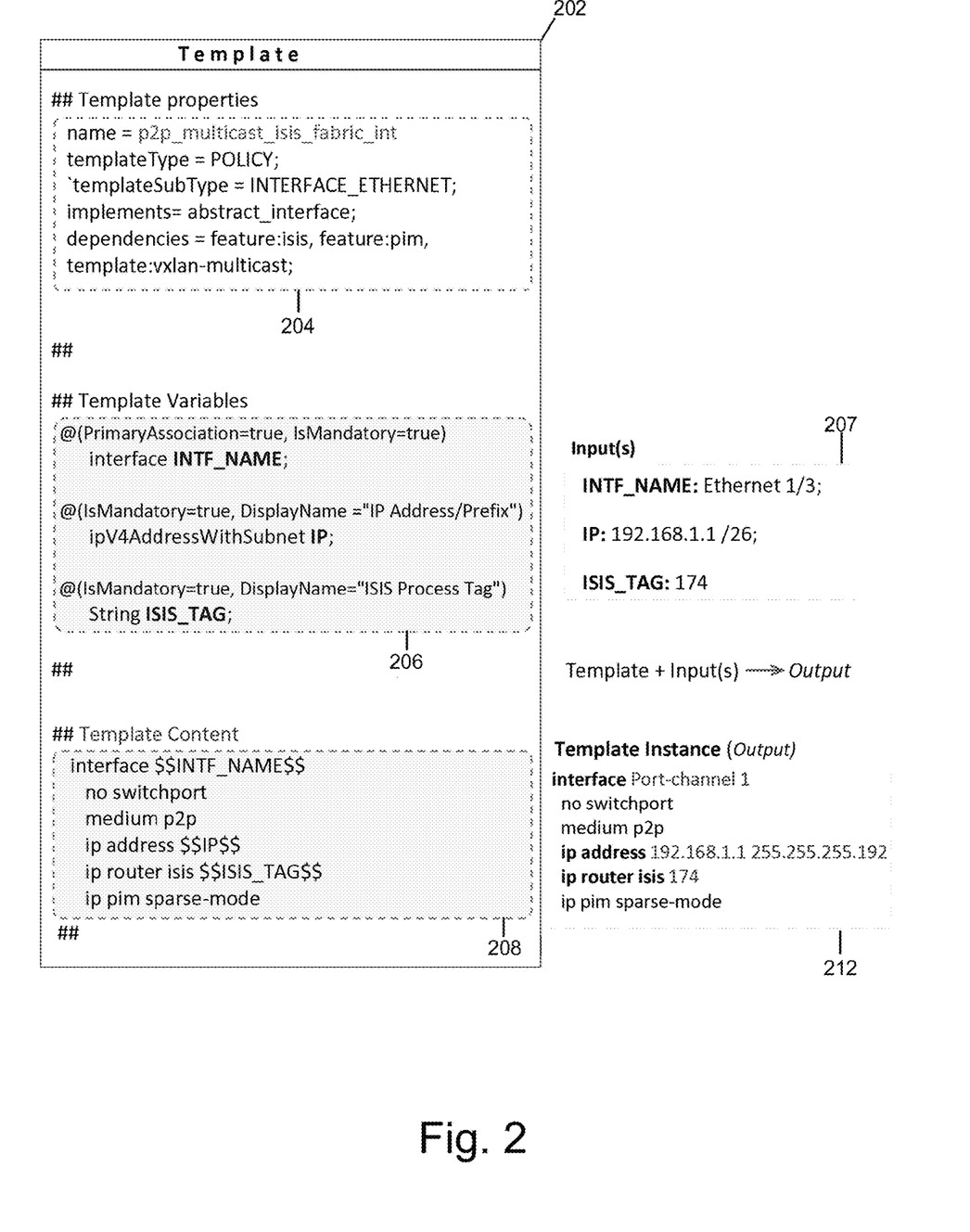
FIG. 2 illustrates an example of a micro-template featuring dependencies, in accordance with some embodiments of the present technology.

With reference to the example (configuration) template 202 in FIG. 2, the meta-data provided in the Properties section 204 describes the Template as a policy type template for an Ethernet Interface implemented as an abstract interface. A dependencies field, also specified in the Properties section 204, specifies a list of features on which the template-defined configuration is dependent for proper implementation—For example, the configuration associated with Template 202 requires both Intermediate System-to-Intermediate System (ISIS) routing and IP Multicast communication to be enabled. An additional dependency to a different configuration template (i.e., template: vxlan-multicast) is also specified.

A set of variablized parameters used with the Template 202 along with associated validation criteria and data types for each variable are provided in the Template Variables section 206. As shown in the Template Variables section 206, the variablized parameters specified for the configuration template 202, includes an Interface identifier parameter (interface INTF_NAME) validated as a directly associated and a mandatory parameter, an Interface IP address and prefix parameter (ipV4AddressWithSubnet IP) validated as a mandatory parameter with a DisplayName value of "IP Address/Prefix" and an Intermediate System-to-Intermediate System (IS-IS) routing process tag (String ISIS_TAG) validated as a mandatory parameter with a DisplayName value of "ISIS Process Tag". As described, device-specific values for the template-specified variablized parameters may be extracted, as template inputs (207), from the corresponding portions of a device running configuration that match the validation criteria associated with each variable declared in the template. Template inputs (207) extracted by reverse-mapping the Template 202 onto a device running configuration corresponds to an interface identifier Ethernet 1/3 with an IP address 192.168.1.1/26 and ISIS process tag 174. These parameter values along with the configurations statements in the template content portion 208 comprise a Template Instance 212 which is what is learned via the reverse template process.

The algorithm for inferring intent behind a device configuration as a function of one or more Policy Template Instances may be running on a network management application such as a Data Center Network Manager (DCNM). DCNM may be a standalone product sitting alongside the network with IP connectivity to the management network of the fabric (in-band or out-of-band). A DCNM may grab the configuration files of each of the devices as they are brought into the fabric and learn the intent behind device Configuration by filtering the configuration files through a plurality of matching templates at varying degrees of granularity until full device configuration is learned. A DCNM may block a device from entering the controlled managed fabric if any configuration errors or configuration mismatches/conflicts with fabric-related intention are identified in the learned device configuration. Once an identified discrepancy is resolved the device may be allowed to join the controlled managed fabric.

A DCNM retrieves individual templates from, for example, a template database and extracts associated parameter values from aspects of the running device configuration matching each of the selected templates to thereby generate one or more expected lines of configuration. The selection of a template to be applied for the inference task may be based on a specific fabric definition and policies. DCNM may then crosscheck the generated configuration expressions to ensure configuration consistency with fabric policies as well as internally within the device itself. If the DCNM finds no conflict with the fabric policies and standards, the generated configuration comprising the template content supplemented with extracted parameter values may be stored as Policy Template Instance (PTI). DCNM validates an inferred device running configuration and ensures that the expected (validated) configuration is on each individual device. Furthermore, DCNM may identify configuration statements related to the fabric best practice and completeness requirement that may be missing from the inferred/learned configuration of the device (i.e., by performing a difference operation between the existing and the expected configuration) and deploy the required configuration statement onto the device to thereby bring the device to full compliance with fabric best practice and completeness requirements.

As described, each template may represent a different aspect of the device configuration. In accordance with some embodiments of the present technology, there may be two types of templates within the system. A Command Line Interface (CLI) templates which serves as masks/screens for extracting relevant parameter values for each aspect of a device configuration, and higher level templates (scripted, for example, using a general purpose programming language like Python) which may contain the additional logic needed for performing aggregation and discovering inter-relationships between the various templates. For example, A controller may apply a CLI micro-template to the existing configuration of a Brownfield device to extract an interface IP address configured on the Brownfield device and then apply one or more Python templates, which may include the additional correlation intelligence, to the same for determining the inter-connectivity profile associated with the extracted IP address.

As described, some embodiments of the present technology may involve one or more CLI templates for extracting information such as network/device addresses, identifiers and/or tags, in addition to higher level templates (i.e., one or more Python scripted templates) for inferring higher-order relationships between various components of a device configuration. In way of another example, from a nested hierarchical perspective on device configurations, the concept of a port channel on a switch represents a logical bundling of several physical ports together into one logical channel. In this case, there may be configuration features that are specific to individual interfaces in addition to configuration features associated with the logical interface bundle that contains the aforementioned individual interfaces. As an example of extracting a hierarchy structure, individual CLI (micro)templates may represent aspects of a device configuration for each of the individual interfaces while a parent Python template may represent the inter-relationships between the micro-templates on the bundled logical interface (port channel interface). The same bundling process may then be applied to a plurality of port-channels aggregated into a virtual port channel. In that case, configuration consistency is established for each physical member port, as well as among various physical member ports comprising a port channel. Additionally configuration consistency is also established for each port channel as well as among various port-channels bundled into a virtual port-channel. Consequently, a DCNM may perform hierarchical reverse mapping until a complete configuration block is extracted and learned.

In accordance with some embodiments of the present technology, the DCNM system may select templates to use for learning a device configuration based on a given fabric definition. As such, specific features that characterize the type and the behavior of a fabric may be used as a standard for determining which set of templates is selected for learning a brownfield deployed device configuration. For example, when bringing a device under management of the DCNM, the specific templates used for matching a device configuration may be dependent on whether Fabric interface numbering scheme is point-to-point or IP unnumbered, whether the underlying link-state protocol is OSPF or ISIS, whether the replication mode utilized by the fabric is Multicast or Ingress, etc. Essentially rules within a fabric template for a given type of fabric may be used in determining which list of templates is selected as a mask to infer the intent behind an existing running device configuration. For example, for an Ethernet VPN Virtual Extensible LAN (EVPN VXLAN) fabric there are some key parameters such as specific Autonomous system number (ASN) that are consistently configured among fabric devices in order for the routes to be appropriately shared within the fabric. Additionally, the relative links between devices on the fabric have point-to-point IP connections, and the underlying route sharing mechanism may be specified as either Open Shortest Path First (OSPF) or Intermediate System to Intermediate System (ISIS).

In accordance with some embodiments of the present technology a network management service running, for example, on a DCNM may implement a fabric configuration through a fabric template that may incorporate one or more user inputs directed at providing values for one or more fabric settings. The user-provided fabric settings may comprise, for example, Border Gateway Protocol Autonomous System number, a specification of a fabric underlay routing protocols, whether the underlay uses multicast or ingress replication for Broadcast, Unknown unicast and Multicast (BUM) traffic, and resources like underlay IP address pool. In some embodiments, one or more fields of the fabric template may be provided with default values that may be over-written with one or more user-provided values. The fabric settings reflect the fabric wide user intention.

Once a fabric definition is in place, the Network Management Service may initiate importing of one or more brownfield devices (leafs and spines) onto the fabric in response to one or more user inputs. In case of a Brownfield import, as indicated by a user input, the Network Management Service attempts to learn a user intention by parsing and analyzing the device running (existing) configurations. Those devices that are part of a Brownfield deployment may be put under the "migration mode" until all the intents have been learned. The learning process may be initiated in response to a User input entered, for example, via a GUI action button. At this point, a DCNM, supplemented with a Network Management Service may retrieve the running/ existing configuration on each device. The DCNM may learn the intention behind a device running the configuration by parsing and analyzing a device existing configuration which, in accordance with some embodiments, may be accomplished by matching a device running configuration against a plurality of configuration templates. The parsing process captures both the matching template (which may be used for specific purposes within a fabric) as well as the variable parameter values (referred to as an Intent.) The DCNM may then validate the inferred device (configuration) intentions against the fabric intention and store the validated device intention (expected configuration) as one or more Policy Template Instances (PTI). Errors may be generated if conflicts are found.

Once the existing configuration is learned, the DCNM may complement/complete a device expected configuration by adding one or more configuration statements associated with fabric best practice policies (best practice completeness) to the device. For example, a DCNM running the Network Management Service may infer the fabric interfaces from the switch running configuration and fabric topology that may be learned via Cisco Discovery Protocol (CDP) or Link Layer Discovery Protocol (LLDP). If a particular feature or functionality is specified in the fabric settings/definition but is missing from the device configuration, the DCNM will deploy the required configuration to the associated device(s) to realize fabric intention. As another example, if a user has indicated the fabric to have bi-directional forwarding detection (BFD) enabled on the fabric interfaces in fabric setting, DCNM will complete the fabric interface configuration intention by adding bi-directional forwarding detection configuration to it.

A DCNM may locate resource information such as the IP addresses used for fabric interfaces, loopback interfaces, as well as identifiers for Virtual Port Channel (VPC), Fabric Extender (FEX) and port-channel from the learned PTIs. These resources may be recorded in the DCNM resource manager for tracking and management, they are also associated with the PTI in which they were learned. The resource learning part ensures that DCNM will not allocate conflicting resources during future automated modifications. At this point, any existing misconfiguration of the devices may also be detected (for example duplicate IPs).

From learned PTIs DCNM may infer whether a device has a VPC peer device and will accordingly set the VPC pairing for the topology display. In way of another example, DCNM may infer, from the learned PTIs, different device roles and functionalities (i.e., which devices are used as BGP Route Reflector (RR), and which devices act as underlay multicast Rendezvous Points (RP). This information may be stored and used to generate the configuration when future Greenfield devices are added to the same fabric.

PTIs representing the configuration intentions may be generated for each device in the fabric as part of learning a device existing configuration and generation of expected (fabric compliant) device configuration. Devices may then be moved out of "migration mode". If additional configuration commands are required to implement fabric best practice completeness, the DCNM may generate and deploy the required configurations directly onto the devices.

In some embodiments of the present technology, a DCNM may make one or more PTIs visible to the user and provide a user interface to enable user-driven editing of the policies wherein a user may change configuration parameter values and/or add or remove some configurations.

Figure 3:
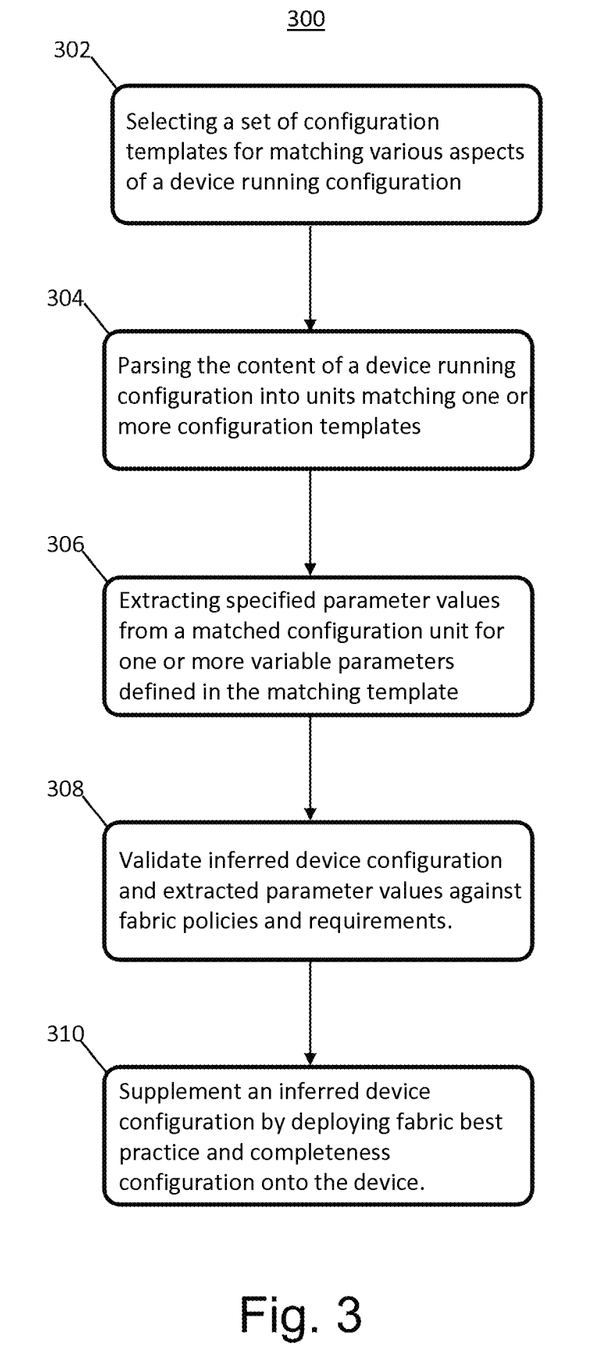
FIG. 3 illustrates an example flowchart of operational steps involved in automated inference/learning of the intention behind a device configuration as determined from device running configuration, in accordance with some embodiments of the present technology.

FIG. 3 provides an example flowchart 300 for illustrating a workflow associated with the process of learning/inferring an existing configuration of a device and generating an expected (fabric-compliant) configuration from the same, in accordance with some embodiments of the present technology. Referring back to the flow chart 300, at step 302 a set of configuration templates for matching one or more aspects of a device configuration is selected by, for example, a DCNM. The selection of the configuration templates may be based on known fabric definitions and policies. At step 304 the content of a device configuration is parsed into units matching one or more configuration templates. The identification of configuration blocks matching a configuration template may be based on template metadata, variable validation conditions, or other identifying information associated with a configuration template. At step 306 one or more parameter values associated with one or more template variables (defined in the matching template) are extracted from the matched configuration portion (unit) of a device configuration. The operation may then move to step 308 wherein the extracted parameter values and inferred device configurations are validated against fabric policies/requirements and stored as Policy Template Instances (PTIs) to represent a device expected configuration. At this point, the operation moves to step 310 wherein configuration statements associated with a fabric best practice policy and completeness requirements, if missing from the expected device configuration, are deployed directly onto the device. In some embodiments of the present technology, an alert may be generated in an event of a conflict between one or more extracted or inferred aspects of a device running configuration and known fabric policies.

In accordance with some embodiments of the present technology, the extracted parameter values retrieved from one or more matched portions of a running configuration (i.e., the running configuration may be associated with a brownfield device designated for deployment onto a fabric) may comprise one or more device host identifiers, one or more interface identifier, one or more IP addresses and/or one or more tag values.

In accordance to some embodiments of the present technology, the plurality of configuration templates for matching one or more aspects of a device running configuration may comprise one or more Python templates for inferring higher-order aspects of a device intended operation.

Figure 4:
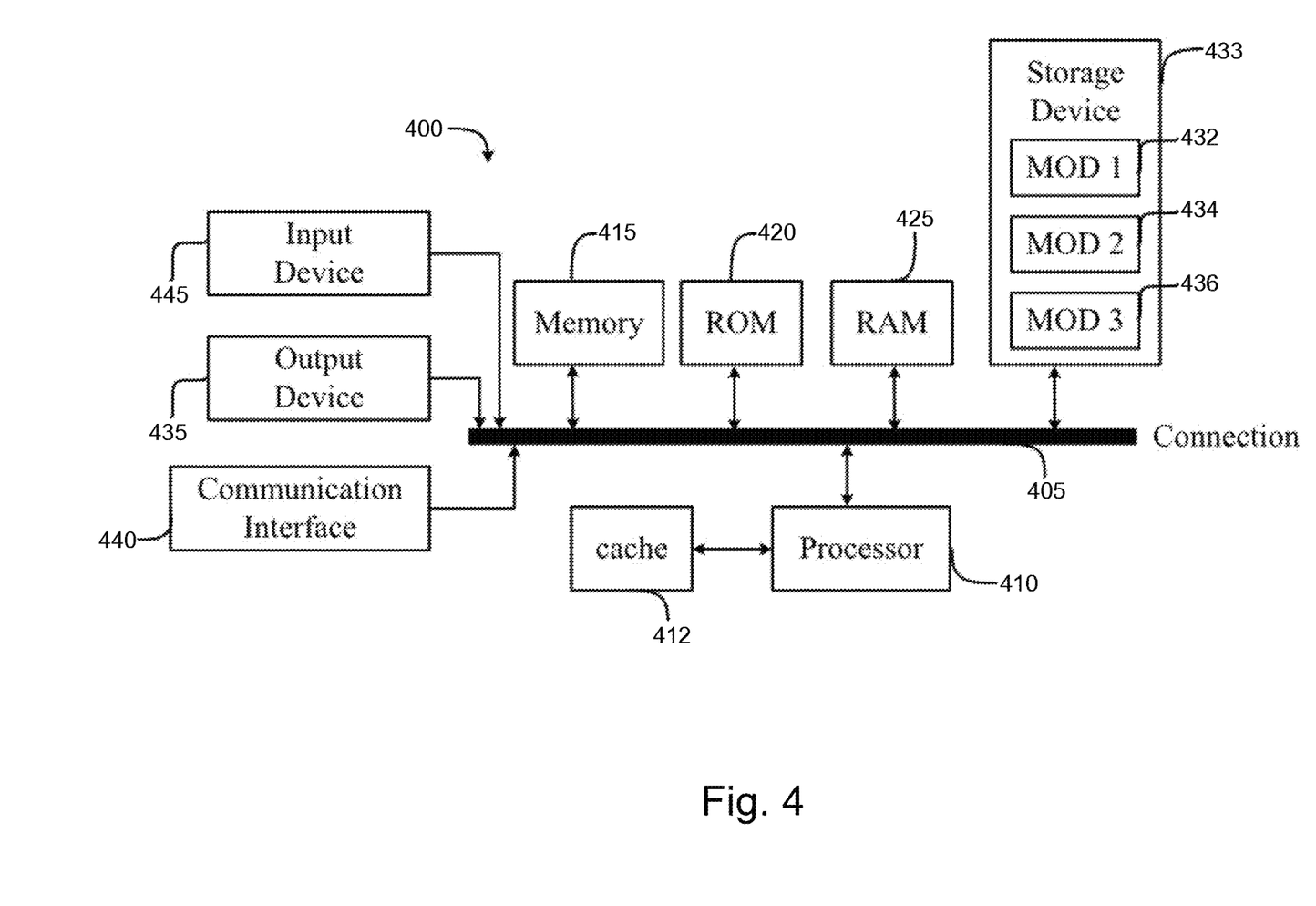
FIG. 4 illustrates an example network device in accordance with some embodiments of the present technology.
Figure 5:
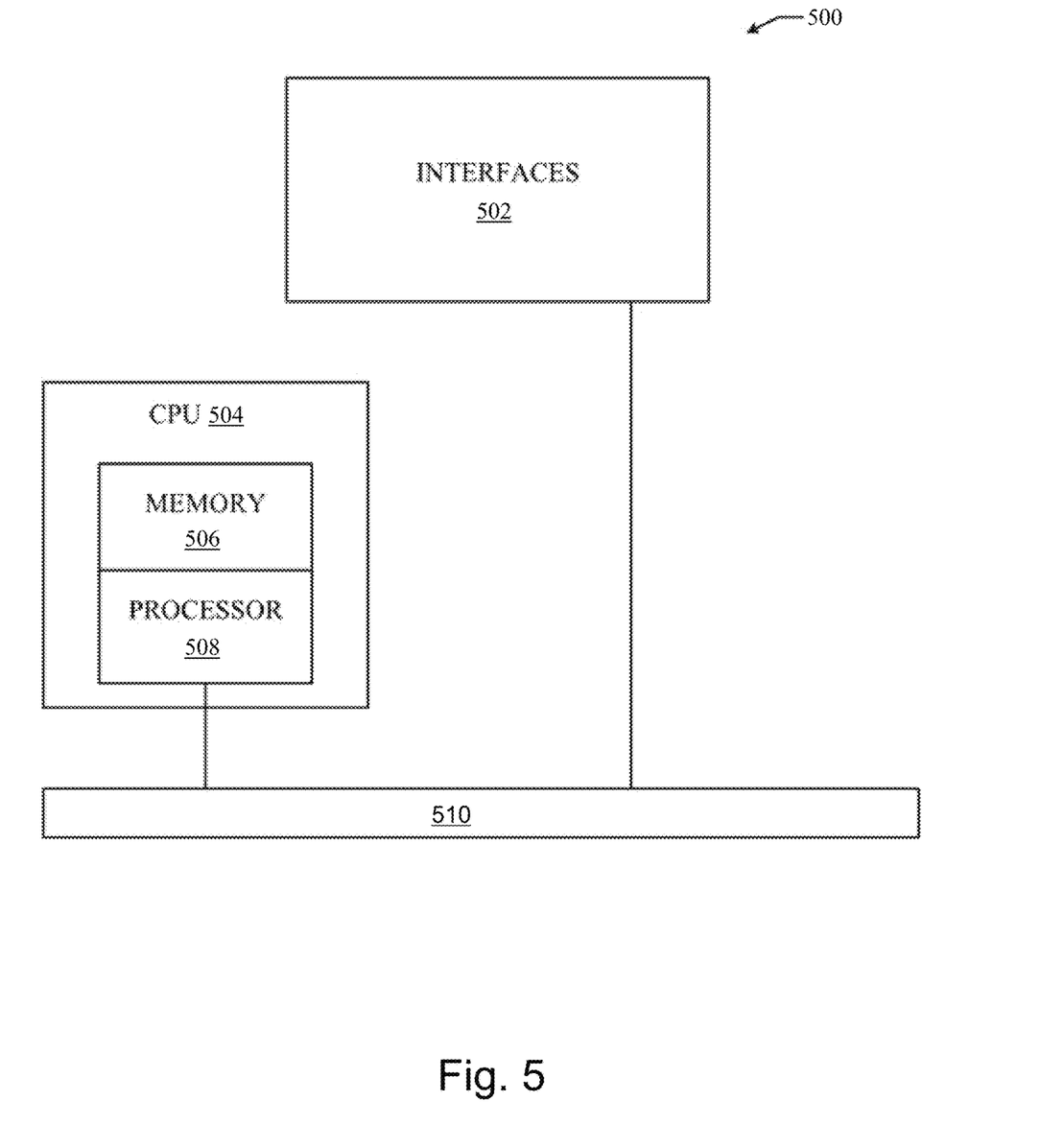
FIG. 5 illustrates an example architecture of a computing device, in accordance with some embodiments of the present technology.

The disclosure now turns to FIGS. 4 and 5, which illustrate example architectures of computing and network devices, such as client computers, switches, routers, controllers, servers, and so forth.

FIG. 4 illustrates a computing system architecture 400 including components in electrical communication with each other using a connection 405, such as a bus. System 400 includes a processing unit (CPU or processor) 410 and a system connection 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware or software service, such as service 1 432, service 2 434, and service 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric.

To enable user interaction with the computing system 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing system 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services 432, 434, 436 for controlling the processor 410. Other hardware or software modules are contemplated. The storage device 430 can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

FIG. 5 illustrates an example network device 500 suitable for performing switching, routing, assurance, and other networking operations. Network device 500 includes a central processing unit (CPU) 504, interfaces 502, and a connection 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X106 family of microprocessors. In some cases, processor 508 can be specially designed hardware for controlling the operations of network device 500. In some cases, a memory 506 (e.g., non-volatile RAM, ROM, TCAM, etc.) also forms part of CPU 504. However, there are many different ways in which memory could be coupled to the system. In some cases, the network device 500 can include memory and/or storage hardware, such as TCAM, separate from CPU 504. Such memory and/or storage hardware can be coupled with the network device 500 and its components via, for example, connection 510.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WI-FI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto-processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing, switching, and/or other operations. The ASIC can communicate with other components in the network device 500 via the connection 510, to exchange data and signals and coordinate various types of operations by the network device 500, such as routing, switching, and/or data storage operations, for example.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for deployment of a Greenfield device, the method comprising:
   generating configuration expressions from at least one configuration template of a plurality of configuration templates based on known fabric policies, the configuration expressions includes a plurality of variables and corresponding values;
   receiving an existing configuration file of a Brownfield device that was previously deployed;
   matching one or more variables of the existing configuration file of the Brownfield device with one or more variables of the plurality of variables of at least one of the configuration expressions from the at least one configuration template of the plurality of configuration templates;
   instantiating the one or more variables of the plurality of variables of at least one of the configuration expressions from the at least one configuration template of the plurality of configuration templates with corresponding values retrieved from a matched portion of the existing configuration of the Brownfield device, to thereby create one to more template instances;
   validating each of the one or more template instances against the known fabric policies to generate one or more Policy Template Instances;
   storing the one or more Policy Template Instances associated with a device existing configuration as a representation of an expected device configuration; and
   provisioning the expected device configuration on the Greenfield device.

2. The method of claim 1, wherein the plurality of configuration templates for matching the one or more variables of the existing configuration of the Brownfield device are generated by a network management service.

3. The method of claim 2, wherein the network management service is implemented as a part of a Data Center Network Manager (DCNM).

4. The method of claim 1, wherein the plurality of configuration templates comprise one or more Command Line Interface (CLI) configuration templates.

5. The method of claim 1, wherein the plurality of configuration templates comprise one or more Python templates for inferring higher order aspects of the Brownfield device intended operation.

6. The method of claim 1, further comprising:
   generating an alert in an event of a conflict between the one or more template instances and the known fabric policies.

7. The method of claim 1, further comprising:
   adding one or more configuration statements to the expected device configuration in accordance with one or more fabric best practice policy and completeness requirements.

8. The method of claim 1, further comprising:
   receiving one or more user inputs for updating and confirming the representation of the device expected configuration.

9. A system comprising:
   one or more processors; and
   at least one computer-readable storage medium having stored therein instructions which, when executed by the one or more processors, cause the one or more processors to:
      generate configuration expressions from at least one configuration template of a plurality of configuration templates based on known fabric policies, the configuration expressions includes a plurality of variables and corresponding values;
      retrieve configuration files of one or more Brownfield devices designated for deployment onto a fabric;
      match one or more variables of the configuration files with one or more variables of the plurality of variables of at least one of the configuration expressions from the at least one configuration template of the plurality of configuration templates;
      instantiate the one or more variables of the plurality of variables of at least one of the configuration expressions from the at least one configuration template of the plurality of configuration templates with one or more corresponding values retrieved from a matched portion of the configuration files of the one or more Brownfield devices thereby create one to more template instances;
      validate each of the one or more template instances against the known fabric policies;
      store one or more validated template instances associated with a device configuration as a representation of an intent associated with the device configuration; and
      provision the device configuration on a Greenfield device.

10. The system of claim 9, wherein the one or more corresponding values retrieved from a matched portion of a Brownfield device configuration comprises at least one of: a Device host identifier, an interface identifier, an IP address, and a tag value.

11. The system of claim 9, wherein the plurality of templates for matching the one or more variables of the configuration files of the one or more Brownfield devices are generated by a network management service.

12. The system of claim 11, wherein the network management service is implemented as a part of a Data Center Network Manager.

13. The system of claim 9, wherein the plurality of templates for matching one or more aspects of the configuration files of the one or more Brownfield devices comprise one or more Command Line Interface (CLI) micro-templates.

14. The system of claim 9, wherein the plurality of templates for matching one or more aspects of the configuration files of the one or more Brownfield devices comprise one or more Python templates for inferring higher-order aspects of a device intended operation.

15. The system of claim 9, further comprising instructions which, when executed by the one or more processors, cause the one or more processors to:
generate an alert in an event of a conflict between the one or more template instances and the known fabric policies.

16. The system of claim 9, further comprising instructions which, when executed by the one or more processors, cause the one or more processors to:
add one or more configuration statements to a device configuration in accordance with one or more best practice policy and completeness requirements of the fabric.

17. The system of claim 9, further comprising instructions which, when executed by the one or more processors, cause the one or more processors to:
receive one or more user inputs for validating the representation of an intent associated with the device configuration.

18. At least one non-transitory computer-readable storage medium having stored therein instructions which, when executed by one or more processors, cause the one or more processors to:
generate configuration expressions from at least one configuration template of a plurality of configuration templates based on known fabric policies, the configuration expressions includes a plurality of variables and corresponding values;
retrieve configuration files of one or more Brownfield devices designated for deployment onto a fabric;
match one or more variables of the configuration files with one or more variables of the plurality of variables of at least one of the configuration expressions from the at least one configuration template of the plurality of configuration template;
in response to a match, instantiate the one or more variables of the variables of the configuration expressions from the at least one configuration template of the plurality of configuration templates with corresponding values retrieved from a matched portion of the configuration files for one or more Brownfield devices thereby create one to more template instances;
validate each of the one or more template instances against the known fabric policies;
store one or more validated template instances associated with a device running configuration as a representation of an intent associated with the device running configuration; and
provision the device running configuration on a Greenfield device.

19. The non-transitory computer-readable storage medium of claim 18, wherein the plurality of templates for matching the one or more variables of the device running configuration comprise one or more Command Line Interface (CLI) micro-templates for inferring one or more resource values from the device running configuration as well as one or more Python templates for inferring higher-order aspects of a device intended operation.

20. The non-transitory computer-readable storage medium of claim 18, further comprising: adding one or more configuration statements to the device running configuration in accordance with one or more best practice policies and completeness requirements of the fabric.

* * * * *